United States Patent
Yoon et al.

(10) Patent No.: US 11,488,316 B2
(45) Date of Patent: Nov. 1, 2022

(54) METHOD AND OPTICAL SYSTEM FOR DETERMINING DEPTH INFORMATION

(71) Applicant: Samsung Electronics Co., Ltd., Suwon-si (KR)

(72) Inventors: Chi-yul Yoon, Hwaseong-si (KR); Ji-Woon Yeom, Suwon-si (KR); Jae-Eun Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 691 days.

(21) Appl. No.: 16/238,066

(22) Filed: Jan. 2, 2019

(65) Prior Publication Data

US 2019/0213745 A1 Jul. 11, 2019

(30) Foreign Application Priority Data

Jan. 10, 2018 (KR) ........................ 10-2018-0003444

(51) Int. Cl.
*G06T 7/50* (2017.01)
*H04N 5/33* (2006.01)
(Continued)

(52) U.S. Cl.
CPC ................ *G06T 7/50* (2017.01); *G01B 11/22* (2013.01); *G02B 6/4204* (2013.01);
(Continued)

(58) Field of Classification Search
CPC ........... G06T 7/50; G06T 7/215; G01B 11/22; G02B 6/4204; G02B 27/017;
(Continued)

(56) References Cited

U.S. PATENT DOCUMENTS 9,400,395 B2   7/2016   Travers et al.
9,984,506 B2   5/2018   Miller
(Continued)

FOREIGN PATENT DOCUMENTS

KR   10-2014-0142337 A   12/2014
KR   10-2017-0018930 A   2/2017

OTHER PUBLICATIONS

International Search Report dated Apr. 30, 2019, issued in International Patent Application No. PCT/KR2019/000325.
(Continued)

*Primary Examiner* — Marin Pichler
*Assistant Examiner* — Mitchell T Oestreich
(74) *Attorney, Agent, or Firm* — Jefferson IP Law, LLP

(57) ABSTRACT

An optical system is provided. The optical system includes an image generator configured to output image signals for configuring a virtual image, and an infrared (IR) image signal, a multipath optical element configured to guide the beams, a diffraction grating configured to diffract parts of the output beams and transmit other parts of the output beams, an outcoupler configured to allow the diffracted beams to exit the multipath optical element, a first camera configured to sense a pattern of reflection of an IR beam exiting the outcoupler, an IR filter diffraction element, a second camera configured to sense a pattern of reflection of the IR beam projected toward the real world, and a processor configured to determine a line of sight of a user based on the pattern sensed by the first camera, and to determine depth information of the object based on the pattern sensed by the second camera.

9 Claims, 7 Drawing Sheets

(51) Int. Cl.
   *G02B 27/09* (2006.01)
   *G06T 7/215* (2017.01)
   *G02F 1/13* (2006.01)
   *G06F 3/01* (2006.01)
   *G01B 11/22* (2006.01)
   *G02B 27/01* (2006.01)
   *G02B 6/42* (2006.01)

(52) U.S. Cl.
   CPC ....... *G02B 27/017* (2013.01); *G02B 27/0944* (2013.01); *G02F 1/1313* (2013.01); *G06F 3/013* (2013.01); *G06T 7/215* (2017.01); *H04N 5/33* (2013.01); *H04N 5/332* (2013.01); *G02B 2027/0187* (2013.01)

(58) Field of Classification Search
   CPC ........ G02B 27/0944; G02B 2027/0187; G02F 1/1313; G06F 3/013; H04N 5/33; H04N 5/332
   USPC .......................................................... 359/630
   See application file for complete search history.

(56) References Cited

U.S. PATENT DOCUMENTS

| | | | |
|---|---|---|---|
| 9,984,508 | B2 | 5/2018 | Mullins et al. |
| 2014/0139551 | A1 | 5/2014 | McCulloch et al. |
| 2016/0171768 | A1 | 6/2016 | Park et al. |
| 2016/0343169 | A1 | 11/2016 | Mullins et al. |
| 2017/0004655 | A1* | 1/2017 | Scavezze ................ G06T 19/20 |
| 2017/0140577 | A1* | 5/2017 | Westerinen ............ G06F 3/011 |
| 2017/0184848 | A1 | 6/2017 | Vallius |
| 2017/0295362 | A1 | 10/2017 | Travis |

OTHER PUBLICATIONS

European Search Report dated Dec. 18, 2020, issued in European Application No. 19738514.9.
Korean Office Action dated Aug. 8, 2022, issued in Korean Patent Application No. 10-2018-0003444.

* cited by examiner

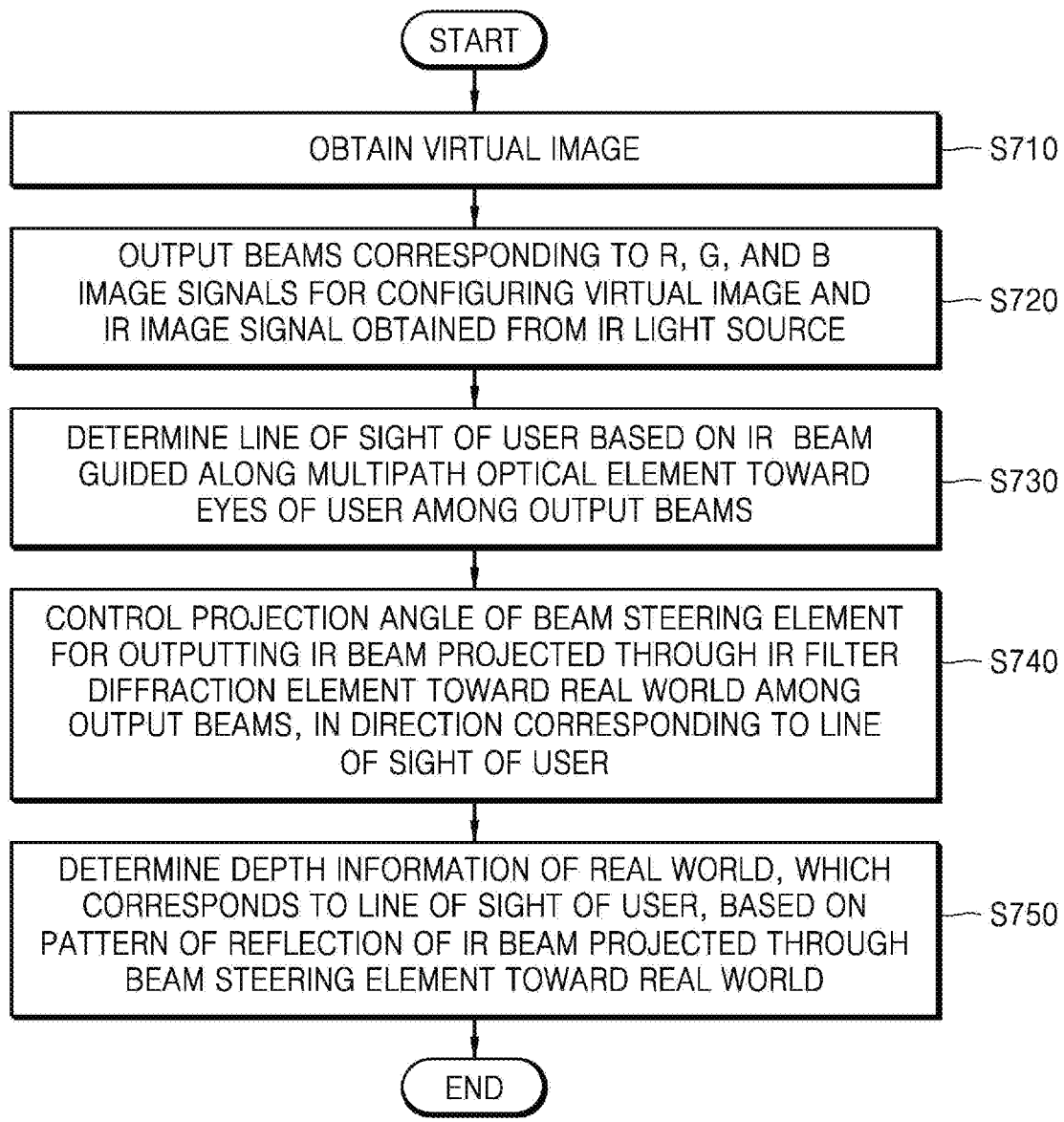

METHOD AND OPTICAL SYSTEM FOR DETERMINING DEPTH INFORMATION

CROSS-REFERENCE TO RELATED APPLICATION(S)

This application is based on and claims priority under 35 U.S.C. § 119(a) of a Korean patent application number 10-2018-0003444, filed on Jan. 10, 2018, in the Korean Intellectual Property Office, the disclosure of which is incorporated by reference herein in its entirety.

BACKGROUND

1. Field

The disclosure relates to methods of determining depth information, optical systems for determining the depth information, and recording media having recorded thereon the methods of determining the depth information.

2. Description of Related Art

Augmented reality (AR) technology is technology capable of overlaying a virtual object or information on a real world environment to be seen like a real object. The AR technology may be used in various applications including military, aviation, medical, video game, entertainment, and sports applications.

Since the AR technology has attracted the attention of many people, various technologies for realizing AR are being actively developed. In particular, to achieve more realistic AR by projecting a virtual image, depth information of a real object needs to be determined for better harmony between the virtual image and the real object. As such, research is being conducted on various methods of obtaining depth information of a real object to realize AR.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide methods and devices for determining not only a line of sight of a user but also depth information of the real world by using an infrared (IR) light source, thereby efficiently reducing power consumption, system complexity, costs, etc. in realizing augmented reality (AR).

Additional aspects will be set forth in part in the description which follows and, in part, will be apparent from the description, or may be learned by practice of the presented embodiments.

In accordance with an aspect of the disclosure, an optical system is provided. The optical system includes an image generator configured to output beams corresponding to red (R), green (G), and blue (B) image signals for configuring a virtual image, and an IR image signal obtained from an IR light source, a multipath optical element configured to guide the beams, a diffraction grating located in the multipath optical element and configured to diffract parts of the output beams and transmit other parts of the output beams, an outcoupler located in the multipath optical element and configured to allow the diffracted beams to exit the multipath optical element, a first camera configured to sense a pattern of reflection of an IR beam exiting the outcoupler, an IR filter diffraction element configured to transmit the IR beam among the transmitted beams and project the IR beam toward an object of a real world, a second camera configured to sense a pattern of reflection of the IR beam projected toward the object of the real world, and a processor configured to determine a line of sight of a user based on the pattern sensed by the first camera, and to determine depth information of the object of the real world based on the pattern sensed by the second camera.

The optical system may further include a beam steering element provided on a side surface of the IR filter diffraction element and configured to control a direction in which the IR beam projected from the IR filter diffraction element is projected toward the real world, based on the line of sight of the user.

The processor may be further configured to determine an electrical signal applied to liquid crystals of the beam steering element, based on the determined line of sight of the user.

The processor may be further configured to control an angle of the beam steering element based on the determined line of sight of the user.

The processor may be further configured to determine distortion of the pattern sensed by the second camera, by comparing the pattern sensed by the second camera, to a pattern of the IR beam projected toward the real world, and to determine the depth information of the real world based on the determined distortion.

The IR beam projected from the IR filter diffraction element may be converted to have a certain structure based on a structure of the IR filter diffraction element.

The processor may be further configured to change a structure of the IR filter diffraction element in a preset time cycle, and to determine an IR region in patterns of reflection of projected IR beams having different structures due to the change in the structure of the IR filter diffraction element, by comparing the patterns.

The optical system may further include a sensing unit configured to measure motion of the user, and the processor may be further configured to determine a cycle of determining the depth information of the real world, based on the motion of the user.

The image generator may be further configured to sequentially output the beams corresponding to the R, G, B, and IR image signals, based on time.

The image generator may include a light output element configured to output the beams by combining the IR image signal with each of the R, G, and B image signals.

In accordance with another aspect of the disclosure, a method of determining depth information is provided. The method includes obtaining a virtual image, outputting beams corresponding to R, G, B image signals for configuring the virtual image, and an IR image signal obtained from an IR light source, and determining a line of sight of a user based on a pattern generated when a first camera senses an IR beam guided along a multipath optical element to eyes of the user among the output beams, and determining depth information of a real world based on a pattern generated when a second camera senses the IR beam projected through an IR filter diffraction element toward the real world among the output beams.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 7 is a flowchart of a method, performed by an optical system, of determining depth information, according to an embodiment of the disclosure.

Throughout the drawings, it should be noted that like reference numbers are used to depict the same or similar elements, features, and structures.

DETAILED DESCRIPTION

Figure 1:
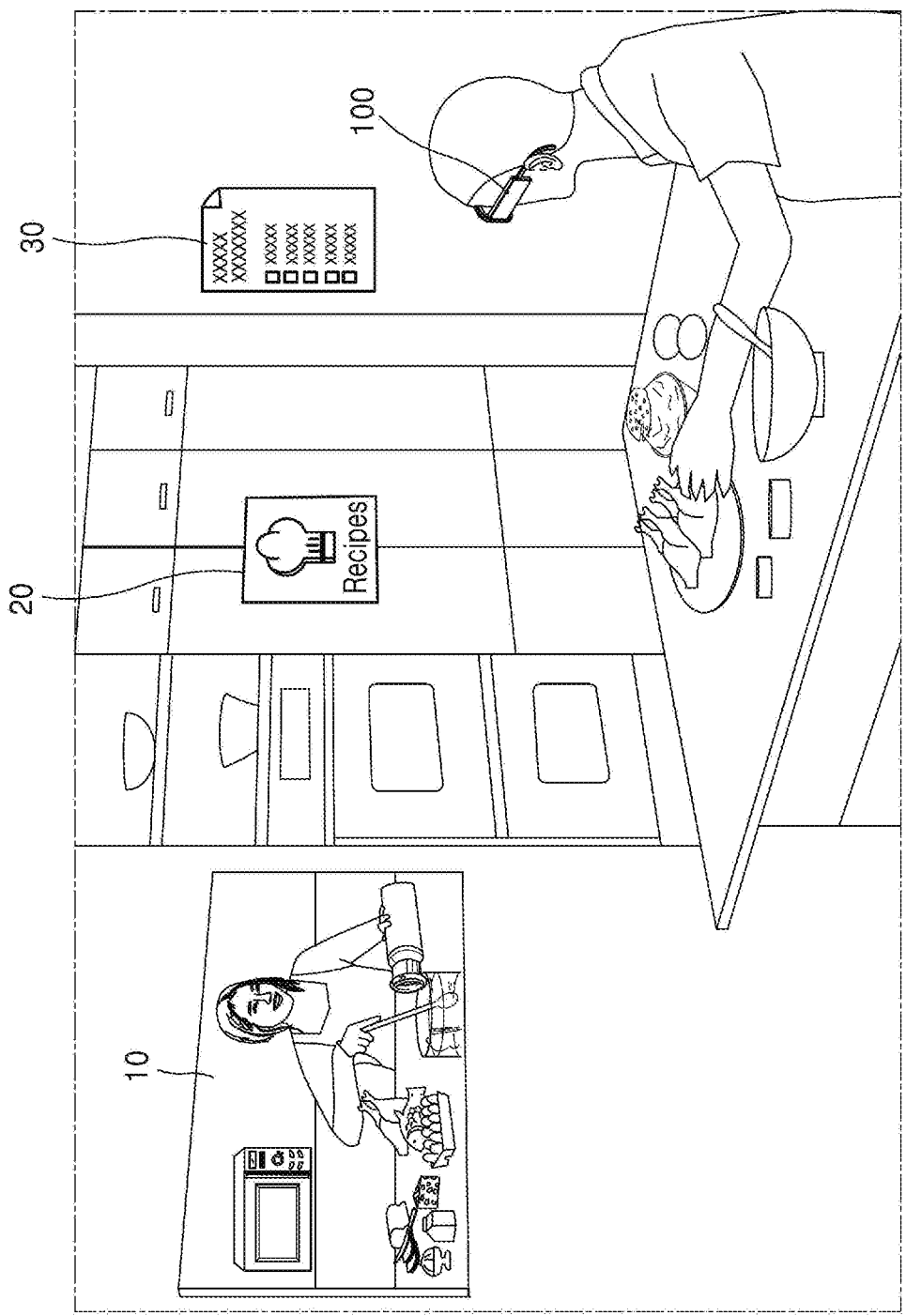
FIG. 1 is a conceptual view for describing a method of providing augmented reality (AR) by using determined depth information, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surface.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the disclosure. As used herein, the term "and/or" includes any and all combinations of one or more of the associated listed items. Expressions such as "at least one of," when preceding a list of elements, modify the entire list of elements and do not modify the individual elements of the list.

It will be understood that the terms "comprises", "comprising", "includes" and/or "including", when used herein, specify the presence of stated elements, but do not preclude the presence or addition of one or more other elements. The term "unit" or "module" is used to denote an entity for performing at least one function or operation, and may be embodied as, but is not limited to, a software element or a hardware element such as a field-programmable gate array (FPGA) or an application-specific integrated circuit (ASIC). A "unit" or "module" may be configured to exist in an addressable storage medium or to operate one or more processors. Thus, for example, the "unit" or "module" includes elements (e.g., software elements, object-oriented software elements, class elements, and task elements), processes, functions, attributes, procedures, subroutines, segments of program code, drivers, firmware, micro-codes, circuits, data, database, data structures, tables, arrays, and parameters. Functions provided in elements and "units" or "modules" may be combined to a smaller number of elements and "units" or "modules" or may be divided into a larger number of elements and "units" or "modules".

Reference will now be made in detail to embodiments, examples of which are illustrated in the accompanying drawings, wherein like reference numerals refer to like elements throughout. In this regard, the embodiments may have different forms and should not be construed as being limited to the descriptions set forth herein. Accordingly, the embodiments are merely described below, by referring to the figures, to explain aspects.

FIG. 1 is a conceptual view for describing a method of providing augmented reality (AR) by using determined depth information, according to an embodiment of the disclosure.

Referring to FIG. 1, a device 100 for determining depth information may overlay virtual images 10, 20, and 30 on a real world such that a user may experience AR. For example, the device 100 may provide the AR by outputting a cooking program video 10, a recipe image 20, a refrigerator ingredient list 30, etc. at user-desired locations of the real world.

To more realistically implement the AR, space information may be required to display virtual images in harmony with objects of the real world. Herein, the space information may include depth information indicating the distances between the user or a preset point and the objects of the real world.

When a depth sensor is additionally used to determine the depth information, the price, weight, and power consumption of the device 100 may be increased and thus efficiency of providing the AR may be lowered. The device 100 according to an embodiment may obtain the depth information based on an infrared (IR) beam generated from an IR light source included in the device 100 without having to additionally use a depth sensor to determine the depth information. Specifically, the device 100 may project an IR beam toward the real world to have a preset structure, and determine the depth information based on a pattern generated when the projected IR beam is reflected from the real world. A detailed description thereof will be provided below with reference to FIGS. 2 to 7. An optical system to be described below in relation to FIGS. 2 to 7 may be understood in the same meaning as the device 100 of FIG. 1.

The device 100 according to an embodiment may be implemented in various forms. For example, the device 100 described in this specification may be smart glasses, a head mounted display (HMD), a near-eye display, a three-dimensional display, or the like. However, the above-mentioned devices are merely examples and the device 100 is not limited thereto.

Figure 2:
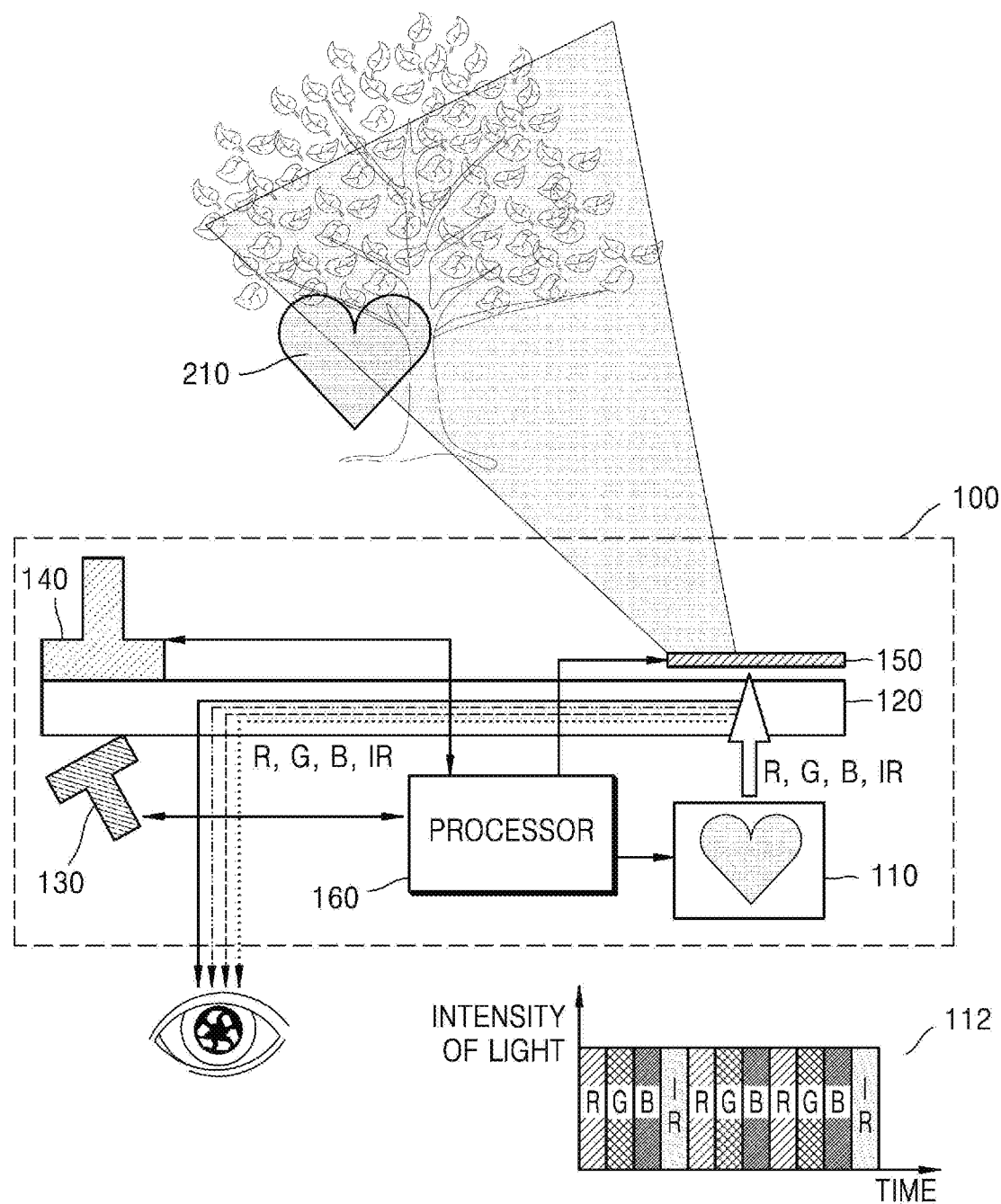
FIG. 2 is a block diagram of an optical system according to an embodiment of the disclosure.

FIG. 2 is a block diagram of an optical system 100 according to an embodiment of the disclosure.

Referring to FIG. 2, the optical system 100 may include an image generator 110, a multipath optical element 120, a first camera 130, a second camera 140, an IR filter diffraction element 150, and a processor 160. However, the above-mentioned elements are merely examples and the elements of the optical system 100 are not limited thereto.

The image generator 110 may obtain a virtual image 210 to be overlaid on a scene of a real world. For example, the image generator 110 may obtain the virtual image 210 from an external device, or directly generate the virtual image 210. In addition, the image generator 110 may obtain an IR image signal from an IR light source. Herein, the IR light source may be included in the image generator 110. However, the IR light source included in the image generator 110 is merely an example and the IR light source may be located outside the image generator 110 and be turned on all the time.

The image generator 110 according to an embodiment may output beams corresponding to red (R), green (G), and blue (B) image signals for configuring the virtual image 210, and the IR image signal obtained from the IR light source. For example, as shown in a graph 112 of FIG. 2, the image generator 110 may sequentially output the beams corresponding to the R, G, B, and IR image signals based on time. According to another example, the image generator 110 may output the beams by combining the IR image signal with each of the R, G, and B image signals, by using a light output element included in the image generator 110.

The image generator 110 may output the beams corresponding to the plurality of image signals by using at least one of a digital light processing (DLP) scheme, a liquid crystal on silicon (LCoS) scheme, and a laser scanning scheme. However, the above-mentioned schemes are merely examples and the beam output scheme of the image generator 110 is not limited thereto.

The multipath optical element 120 may guide at least parts of the plurality of image signals output from the image generator 110, to be incident on eyes of the user. The multipath optical element 120 may have a structure in which a medium having a high refractive index is surrounded by a medium having a low refractive index.

At least parts of the plurality of image signals output from the image generator 110 may be bent by a grating structure of the multipath optical element 120 and be provided along the multipath optical element 120 to the eyes of the user. For example, parts of the output beams may be diffracted by and the other parts thereof may be transmitted through the diffraction grating located inside the multipath optical element 120. The diffracted beams may be output outside the multipath optical element 120 by an outcoupler located inside the multipath optical element 120.

The user may perceive the virtual image 210 due to the beams corresponding to the R, G, and B image signals among the beams guided to be incident on the eyes of the user. The IR beam among the guided beams may be used by the first camera 130 to detect a line of sight of the user.

The first camera 130 may detect the eyes of the user by using the IR beam uniformly projected onto the eyes of the user among the guided beams, as a light source. For example, the first camera 130 may detect the eyes of the user by sensing the IR beam projected onto and then reflected from the eyes of the user, and determine the line of sight of the user based on center points or pupils of the detected eyes of the user.

The light output from the image generator 110 may be mostly incident on the IR filter diffraction element 150. The IR filter diffraction element 150 according to an embodiment may project only the IR beam among the incident beams toward the real world. The IR filter diffraction element 150 may have a certain structure. As such, the IR beam incident on the IR filter diffraction element 150 may be converted to have a certain structure corresponding to the structure of the IR filter diffraction element 150 and then be projected toward the real world. For example, the IR filter diffraction element 150 may convert the incident IR beam to have a structure of a grid, dots, an array, or the like, and then project the converted IR beam toward the real world.

The second camera 140 may sense a pattern generated when the IR beam projected toward the real world is reflected from a real object. Since the IR signal projected toward the real world is reflected from the real object, the certain structure of the IR signal may be distorted. The second camera 140 may obtain pattern distortion information by sensing the pattern.

The processor 160 may determine depth information of the real world based on the pattern sensed by the second camera 140. The processor 160 may compare the sensed pattern to the certain pattern of the projected IR signal. The processor 160 may determine the depth information of the real world based on a degree of distortion of the sensed pattern, which is determined as a result of the comparison.

To distinguish between a visible light region and an IR region included in the sensed pattern and to more accurately detect the IR region, the processor 160 may change the structure of the IR filter diffraction element 150 to project IR beams having different structures. For example, the processor 160 may change the structure of the IR filter diffraction element 150 by controlling an electrical signal applied to the IR filter diffraction element 150. However, the above-described method is merely an example and the method of changing the structure of the IR filter diffraction element 150 is not limited thereto.

The processor 160 may sense patterns generated when an IR beam having a grid structure, an IR beam having a dot structure, and an IR beam having an array structure are projected, and compare the sensed patterns. The processor 160 may identify an IR region in the patterns based on a result of the comparison.

The processor 160 according to an embodiment may obtain user motion information measured by a sensing unit (not shown). The processor 160 may specify a cycle of determining the depth information, based on the user motion information. According to another embodiment, the processor 160 may specify the cycle of determining the depth information, in consideration of characteristics of the virtual image 210, e.g., consistency with the real world. For example, the processor 160 may set a short cycle of determining the depth information, for the virtual image 210 which requires a high consistency.

Figure 3:
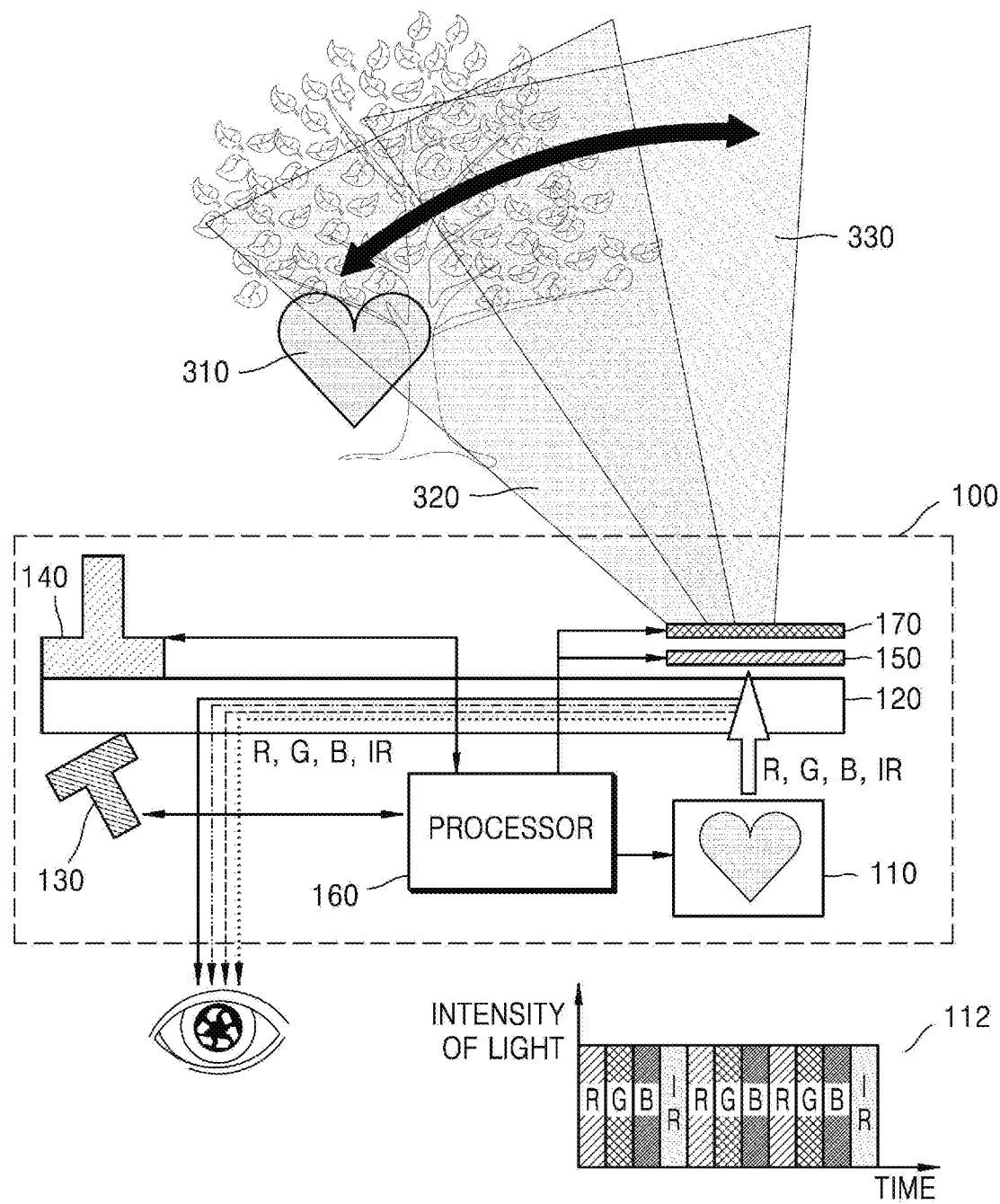
FIG. 3 is a block diagram of an optical system according to an embodiment of the disclosure.

FIG. 3 is a block diagram of an optical system 100 according to an embodiment of the disclosure.

Referring to FIG. 3, the optical system 100 may include an image generator 110, a multipath optical element 120, a first camera 130, a second camera 140, an IR filter diffraction element 150, a processor 160, and a beam steering element 170. However, the above-mentioned elements are merely examples and the elements of the optical system 100 are not limited thereto.

In the current embodiment, the image generator 110, the multipath optical element 120, the first camera 130, the second camera 140, and the IR filter diffraction element 150 correspond to the image generator 110, the multipath optical element 120, the first camera 130, the second camera 140, and the IR filter diffraction element 150 of FIG. 2, and thus detailed descriptions thereof will not be provided.

The processor 160 may determine a line of sight of a user based on an image of eyes of the user, which is captured by the first camera 130. The processor 160 may determine a direction of the line of sight of the user and a distance to a target point of the line of sight of the user based on center points of the eyes extracted from the captured image of the eyes.

As the line of sight of the user is determined, the processor 160 may control the beam steering element 170 in such a manner that an IR beam passing through the IR filter diffraction element 150 is projected in a direction of the line of sight of the user.

The beam steering element 170 may be a first-type beam steering element capable of electrically controlling a projection direction of an incident IR beam, or a second-type beam steering element capable of mechanically controlling the projection direction by using an actuator or the like. However, the type of the beam steering element 170 is not limited to the above-described examples.

In the first-type beam steering element capable of electrically controlling the projection direction, orientation of liquid crystals may be changed depending on an applied electrical signal. For example, the processor 160 may control projection directions 320 and 330 of the IR beam by applying an electrical signal to the beam steering element 170 to project the IR beam in a direction corresponding to the line of sight of the user. The second-type beam steering element capable of mechanically controlling the projection direction may control an angle of the second-type beam steering element based on the line of sight of the user, which is determined by the processor 160.

Figure 4:
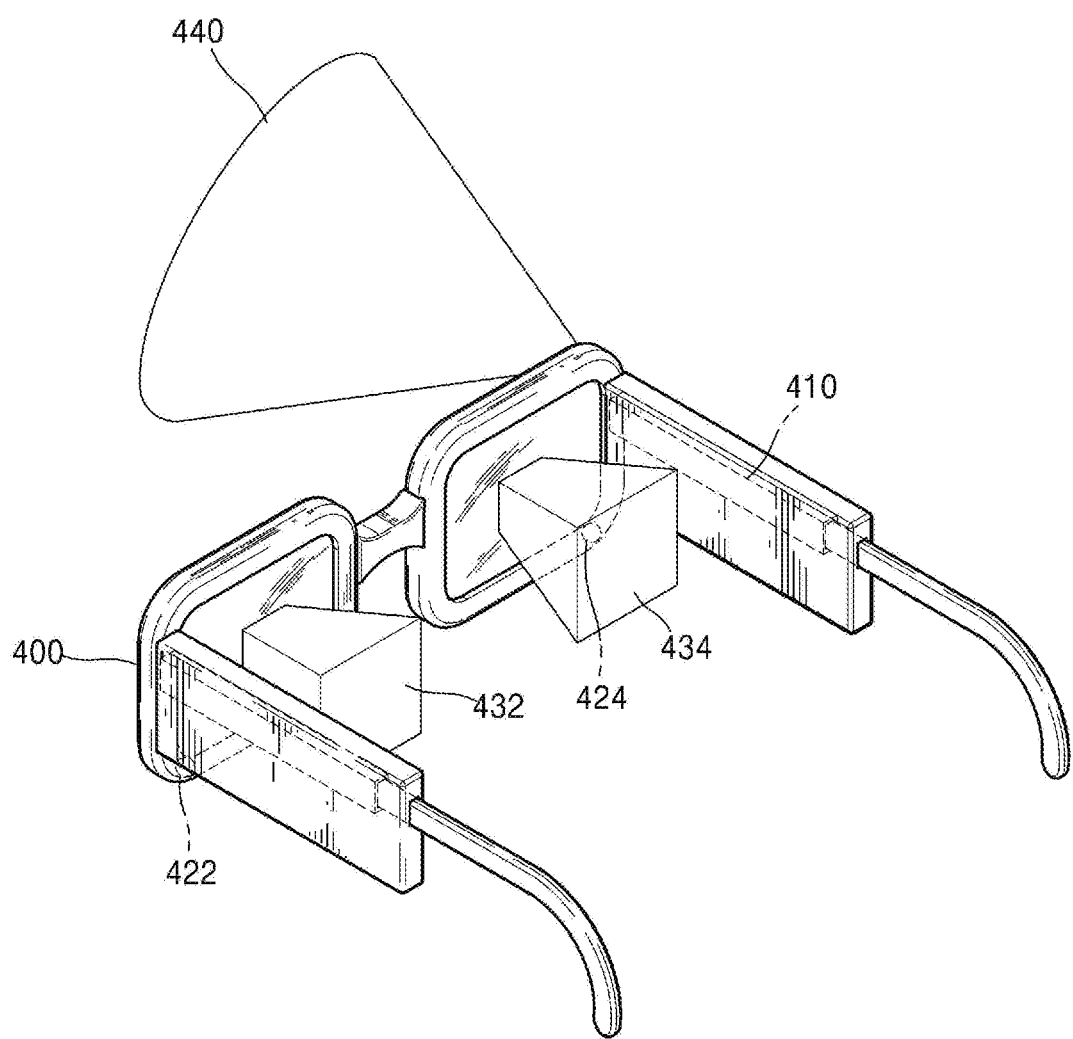
FIGS. 4 and 5 are perspective views for specifically describing a structure of an optical system according to various embodiments of the disclosure.
Figure 5:
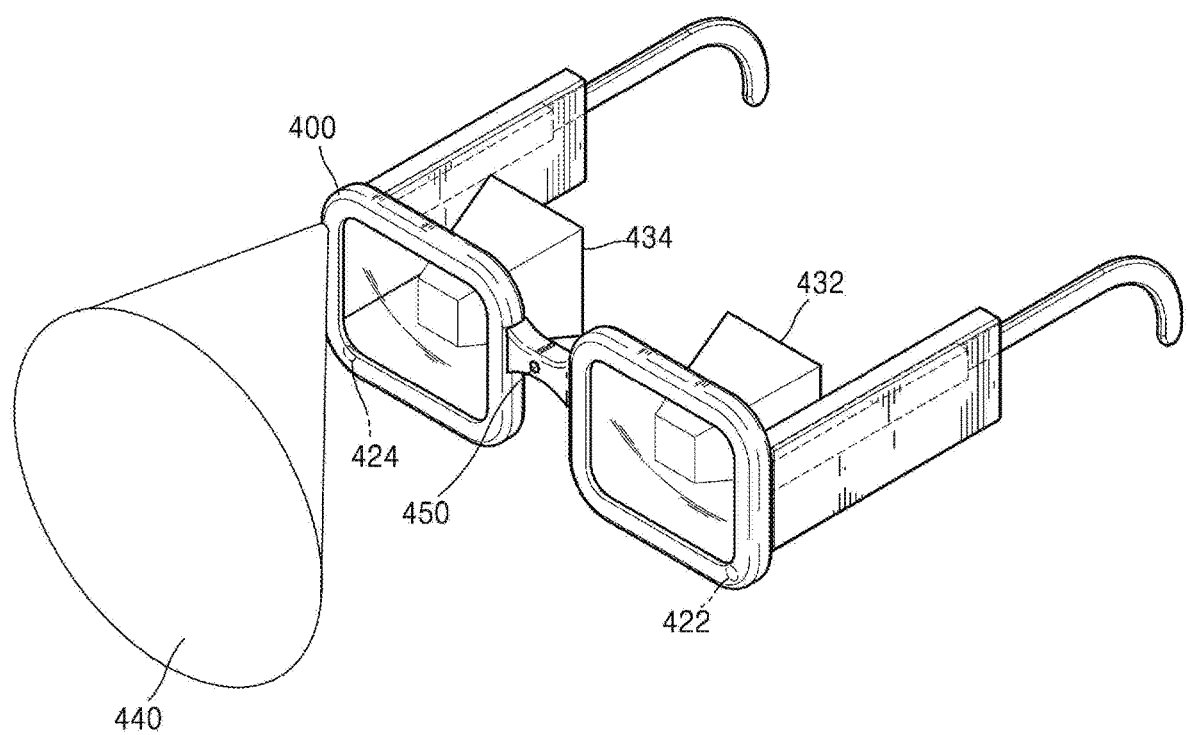

FIGS. 4 and 5 are perspective views for specifically describing a structure of an optical system 400 according to various embodiments of the disclosure.

Referring to FIG. 4, the optical system 400 is illustrated in a direction of a line of sight of a user. Although the optical system 400 may include an image generator, a multipath optical element, a first camera, a second camera, an IR filter diffraction element, a processor, a beam steering element, etc. as described above in relation to FIGS. 2 and 3, only an image generator 410 and multiple first cameras 422 and 424 will be described in relation to FIG. 4.

The image generator 410 may be provided at a side of the optical system 400 where a supporter for fixing the optical system 400 to the head of the user is located. The image generator 410 is provided at a right side of the optical system 400 in FIG. 4 according to the current embodiment. However, the right side is merely an example and the image generator 410 may be provided at a left side of the optical system 400. According to another embodiment, the image generator 410 may be located at a front side of the optical system 400.

The image generator 410 may output beams corresponding to R, G, and B image signals for configuring a virtual image, and an IR image signal obtained from an IR light source. Herein, the IR light source may be included in the image generator 410. However, the IR light source included in the image generator 410 is merely an example and, according to another example, the IR light source may be located outside the image generator 410. An IR beam 440 output from the image generator 410 may be uniformly projected toward a front side of the user.

The multiple first cameras 422 and 424 may obtain an image of eyes by using IR beams projected toward the eyes of the user among the plurality of image signals output from the image generator 410, as a light source. In this case, the IR beams may be projected toward the eyes of the user together with parts of the beams corresponding to the R, G, and B image signals for configuring the virtual image.

The multiple first cameras 422 and 424 according to an embodiment may be provided at outer lower sides of the eyes in such a manner that eyelids and eyebrows do not disturb obtaining of the image of the eyes. A viewing angle of the multiple first cameras 422 and 424 may be determined based on the distance between pupils and the size of eyeballs. For example, when the distance between pupils is 1.5 cm and the size of eyeballs is 5×3 cm, the viewing angle of the multiple first cameras 422 and 424 may be set to be a field of view (FoV) of 75°.

Referring to FIG. 5, the optical system 400 is illustrated in a direction opposite to a direction of a line of sight of a user. Although the optical system 400 may include an image generator, a multipath optical element, a first camera, a second camera, an IR filter diffraction element, a processor, a beam steering element, etc. as described above in relation to FIGS. 2 and 3, only a second camera 450 will be described in relation to FIG. 5.

Parts 432 and 434 among beams sequentially output from an image generator (not shown) based on time may be projected along a multipath optical element (not shown) toward eyes of the user, and the other image signals may be projected onto an IR filter diffraction element (not shown). In this case, only an IR beam 440 among the projected image signals may be projected toward a real world by the IR filter diffraction element. The IR beam 440 having passed through the IR filter diffraction element may be uniformly projected toward the real world. In addition, the IR beam 440 having passed through the IR filter diffraction element may be converted to have a certain structure based on the structure of the IR filter diffraction element.

The second camera 450 may capture an image of a pattern generated when the IR beam 440 is reflected from the real world. In this case, the certain structure of the IR beam 440 reflected from a real object of the real world may be distorted. The second camera 450 may capture an image of a distortion pattern, and provide the same to a processor (not shown). The processor may determine depth information based on the distortion pattern.

When the second camera 450 according to an embodiment is implemented as a single camera, the second camera 450 may be located at the center of the optical system 400. In addition, a viewing angle of the second camera 450 may be set to be 60° which is twice a normal perception range of 30°. However, the single camera is merely an example and the second camera 450 may be implemented as stereo cameras. In this case, the stereo cameras may be located at left and right ends of the optical system 400.

The optical system 400 described above in relation to FIGS. 4 and 5 is merely an example of the structure of an optical system for determining depth information, according to an embodiment, and the disclosure is not limited thereto.

Figure 6:
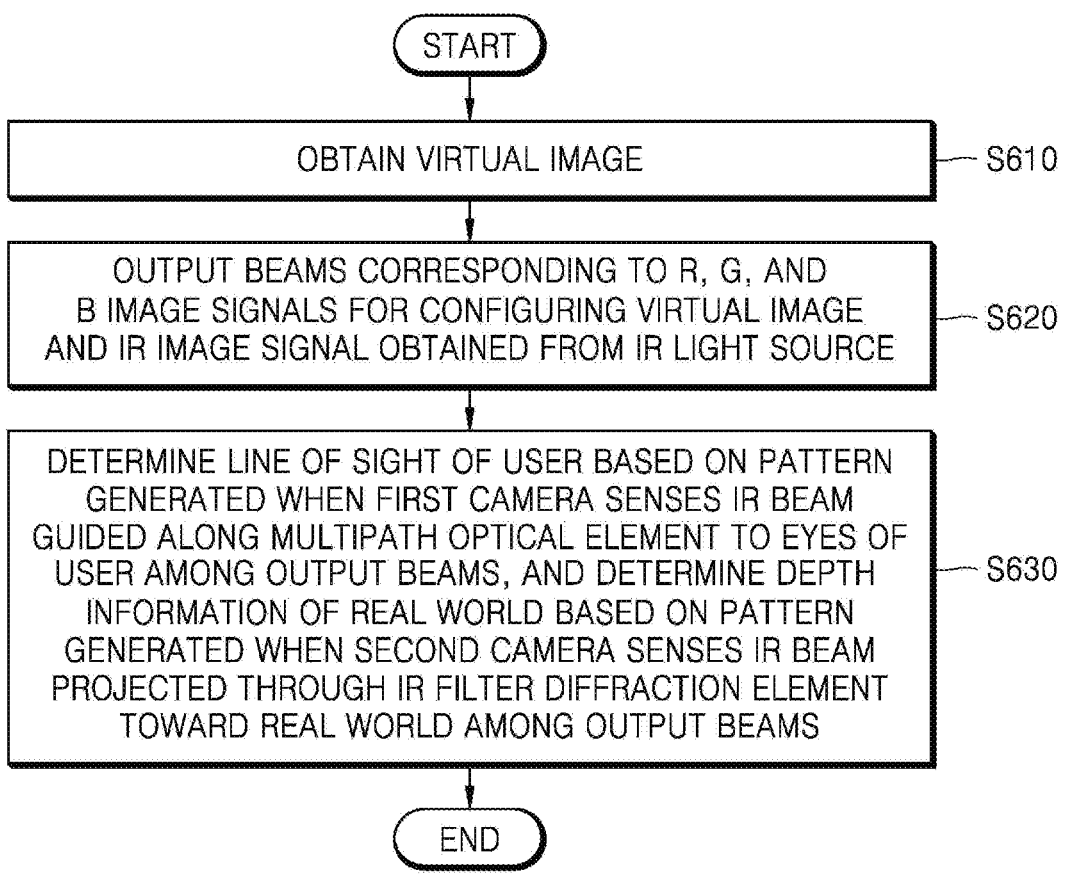
FIG. 6 is a flowchart of a method, performed by an optical system, of determining depth information, according to an embodiment of the disclosure.

FIG. 6 is a flowchart of a method, performed by an optical system, of determining depth information, according to an embodiment of the disclosure.

Referring to FIG. 6, in operation S610 the optical system may obtain a virtual image. The optical system according to an embodiment may obtain the virtual image from an external device, or directly generate the virtual image. In addition, the optical system may determine the type of the obtained virtual image in consideration of an input or a situation of a user. For example, when the user selects a cooking program video, the optical system may obtain the cooking program video as the virtual image.

In operation S620, the optical system may output beams corresponding to R, G, and B image signals for configuring the virtual image and an IR image signal obtained from an IR light source.

For example, the optical system may repeatedly output the beams based on time in the order of the beam corresponding to the R image signal, the beam corresponding to the G image signal, the beam corresponding to the B image signal, and the beam corresponding to the IR image signal. Herein, the R, G, and B image signals may have different values or intensities of pixels based on characteristics of the virtual image, but the IR image signal may have a uniform intensity over the whole image region. According to another example, the optical system may output the beams by combining the IR image signal with each of the R, G, and B image signals.

As described above in relation to FIG. 2, the optical system may output the plurality of image signals by using at least one of a DLP scheme, an LCoS scheme, and a laser scanning scheme. However, the above-mentioned schemes are merely examples and the image signal output scheme is not limited thereto.

In operation S630, the optical system may determine a line of sight of the user based on a pattern generated when a first camera senses the IR beam guided along a multipath optical element to eyes of the user among the output beams, and determine depth information of a real world based on a pattern generated when a second camera senses the IR beam projected through an IR filter diffraction element toward the real world among the output beams.

The output beams may be mostly projected onto the IR filter diffraction element, but parts thereof may be guided through the multipath optical element to the eyes of the user. Specifically, parts of the output beams may be bent by a grating structure on a surface of the multipath optical element and be provided along the multipath optical element toward the eyes.

The optical system may sense the eyes of the user by using the IR beam among the beams provided toward the eyes, as a light source. The optical system may determine a direction of the line of sight of the user and a target point of the line of sight of the user based on an image of the eyes of the user, which is obtained as a result of the sensing.

Among the beams output from the optical system and incident on the IR filter diffraction element, only the IR beam may be projected toward the real world by the IR filter diffraction element. In this case, the IR beam projected toward the real world may have a certain structure based on the structure of the IR filter diffraction element.

The optical system may determine the depth information of the real world based on a pattern generated when the IR beam projected toward the real world is reflected from a real object.

According to another embodiment, the optical system may control IR beams having different structures to be projected toward the real world, by changing the structure of the IR filter diffraction element based on time. The optical system may compare patterns generated when the IR beams having different structures are reflected, and identify an IR region among a visible light region and the IR region included in the patterns. The optical system may increase accuracy of the depth information by identifying distortion of the patterns in the IR region and correcting the identified distortion.

According to another embodiment, the optical system may detect motion of the user. The optical system may specify a cycle of determining the depth information, based on the detected motion of the user. According to another embodiment, the optical system may specify the cycle of determining the depth information, in consideration of characteristics of the virtual image, e.g., consistency with the real world.

FIG. 7 is a flowchart of a method, performed by an optical system, of determining depth information, according to an embodiment of the disclosure.

Referring to FIG. 7, in operation S710 the optical system may obtain a virtual image.

Operation S710 may correspond to operation S610 described above in relation to FIG. 6.

In operation S720, the optical system may output beams corresponding to R, G, and B image signals for configuring the virtual image and an IR image signal obtained from an IR light source.

Operation S720 may correspond to operation S620 described above in relation to FIG. 6.

In operation S730, the optical system may determine a line of sight of a user based on the IR beam provided along a multipath optical element toward eyes of the user among the output beams.

The optical system according to an embodiment may sense the eyes of the user based on the IR beam provided to the eyes of the user. The optical system may determine the line of sight of the user based on an image of the sensed eyes of the user.

In operation S740, the optical system may control a projection angle of a beam steering element for outputting the IR beam projected through an IR filter diffraction element toward a real world among the output beams, in a direction corresponding to the line of sight of the user.

For example, when the projection angle of the beam steering element is electrically controllable, the optical system may apply an electrical signal to the beam steering element in such a manner that the projection angle corresponds to the line of sight of the user. According to another example, when the projection angle of the beam steering element is mechanically controllable, the optical system may control the beam steering element in such a manner that, for example, an angle at which the beam steering element is placed corresponds to the line of sight of the user.

In operation S750, the optical system may determine depth information of the real world, which corresponds to the line of sight of the user, based on a pattern of reflection of the IR beam projected through the beam steering element toward the real world.

After the projection angle of the beam steering element included in the optical system according to an embodiment is controlled, the optical system may project the IR beam in a direction of the line of sight of the user. The optical system may obtain information about a pattern generated when the IR beam projected in the direction of the line of sight of the user is reflected from an object of the real world. The optical system may determine the depth information of the real world, which corresponds to the direction of the line of sight of the user, by comparing the information about the pattern to the structure of the projected IR beam.

The method according to an embodiment of the disclosure can be implemented in the form of program commands that can be executed through various computer components and recorded on a non-transitory computer-readable recording medium. The non-transitory computer-readable recording medium may include program commands, data files, data structures, or a combination thereof. The program commands recorded on the non-transitory computer-readable recording medium may be program commands specially designed and configured for the disclosure or program commands known to and usable by one of ordinary skill in the art of computer software. Examples of the non-transitory computer-readable recording medium include magnetic media (e.g., a hard disk, a floppy disk, and a magnetic tape), optical recording media (e.g., a compact disc-read only memory (CD-ROM) and a digital versatile disc (DVD)), magneto-optical media (e.g., a floptical disk), and hardware devices specially configured to store and execute program commands (e.g., a ROM, a random access memory (RAM), and a flash memory). Examples of the program commands include machine code generated by a compiler and high-level language code that can be executed by a computer using an interpreter or the like.

For the purposes of promoting an understanding of the principles of the embodiments, reference has been made to the various aspects illustrated in the drawings, and specific language has been used to describe these aspects. However, no limitation of the scope of the disclosure is intended by this specific language, and the embodiments may encompass all components that would normally occur to one of ordinary skill in the art.

The disclosure may be described in terms of functional block components and various processing steps. Such functional blocks may be realized by any number of hardware and/or software components configured to perform the specified functions. For example, the disclosure may employ various integrated circuit components, e.g., memory elements, processing elements, logic elements, look-up tables, and the like, which may carry out a variety of functions under the control of one or more microprocessors or other control devices. Similarly, where the elements of the disclosure are implemented using software programming or software elements the disclosure may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the disclosure could employ any number of conventional techniques for electronics configuration, signal processing and/or control, data processing and the like. The words "mechanism", "element", "means", and "configuration" are used broadly and are not limited to mechanical or physical embodiments, but can include software routines in conjunction with processors, etc.

The particular implementations shown and described herein are illustrative examples of the disclosure and are not intended to otherwise limit the scope of the disclosure in any way. For the sake of brevity, conventional electronics, control systems, software development and other functional aspects of the systems may not be described in detail. Furthermore, the connecting lines, or connectors shown in the various figures presented are intended to represent functional relationships and/or physical or logical couplings between the various elements. It should be noted that many alternative or additional functional relationships, physical connections or logical connections may be present in a practical device. Moreover, no item or component is essential to the practice of the disclosure unless the element is specifically described as "essential" or "critical".

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An optical system comprising:
    an image generator configured to output beams corresponding to red (R), green (G), and blue (B) image signals for configuring a virtual image, and an infrared (IR) image signal obtained from an IR light source;
    a multipath optical element comprising a diffraction grating and an outcoupler, parts of the beams output from the image generator being diffracted by the diffraction grating and other parts of the beams output from the image generator being transmitted through the diffraction grating through the multipath optical element, the diffracted beams exiting from the multipath optical element by the outcoupler;
    a first camera configured to detect a first reflected pattern of at least one IR beam among the beams exiting from the multipath optical element;
    an IR filter diffraction element configured to transmit an IR beam among the beams transmitted through the diffraction grating and project the IR beam toward an object of a real world;
    a second camera configured to detect a second reflected pattern of the IR beam projected by the IR filter diffraction element and reflected by the object of the real world; and
    a processor configured to:
        determine a line of sight of a user based on the first reflected pattern detected by the first camera,
        determine distortion of the second reflected pattern detected by the second camera, by comparing the second reflected pattern to a pattern of the IR beam projected toward the object of the real world, and
        determine depth information of the object of the real world based on the determined distortion.

2. The optical system of claim 1, further comprising a beam steering element provided on a side surface of the IR filter diffraction element and configured to, based on the determined line of sight of the user, control a direction in which the IR beam projected from the IR filter diffraction element is projected.

3. The optical system of claim 2, wherein the processor is further configured to, based on the determined line of sight of the user, determine an electrical signal applied to liquid crystals of the beam steering element.

4. The optical system of claim 2, wherein the processor is further configured to, based on the determined line of sight of the user, control an angle of the beam steering element.

5. The optical system of claim 1, wherein the IR beam projected from the IR filter diffraction element is converted to have a certain structure based on a structure of the IR filter diffraction element.

6. The optical system of claim 1, wherein the processor is further configured to:
   change a structure of the IR filter diffraction element in a preset time cycle, and
   determine an IR region in reflected patterns of projected IR beams having different structures due to the change in the structure of the IR filter diffraction element, by comparing the reflected patterns.

7. The optical system of claim 1, further comprising:
   a sensor configured to measure motion of the user,
   wherein the processor is further configured to determine a cycle of determining the depth information of the object of the real world, based on the motion of the user.

8. The optical system of claim 1, wherein the image generator is further configured to sequentially output the beams corresponding to the R, G, B, and IR image signals, based on time.

9. The optical system of claim 1, wherein the image generator comprises a light output element configured to output the beams by combining the IR image signal with each of the R, G, and B image signals.

* * * * *